United States Patent
Chen et al.

(10) Patent No.: US 7,694,035 B2
(45) Date of Patent: Apr. 6, 2010

(54) DMA SHARED BYTE COUNTERS IN A PARALLEL COMPUTER

(75) Inventors: Dong Chen, Croton on Hudson, NY (US); Alan G. Gara, Mount Kisco, NY (US); Philip Heidelberger, Cortlandt Manor, NY (US); Pavlos Vranas, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 11/768,781

(22) Filed: Jun. 26, 2007

(65) Prior Publication Data
US 2009/0006666 A1    Jan. 1, 2009

(51) Int. Cl.
G06F 13/28    (2006.01)
G06F 3/00    (2006.01)
G06F 5/00    (2006.01)

(52) U.S. Cl. .......................... 710/22; 710/52
(58) Field of Classification Search ........................ None
See application file for complete search history.

(56) References Cited

U.S. PATENT DOCUMENTS 6,799,232 B1 * 9/2004 Wang ........................... 710/65
2001/0055323 A1 * 12/2001 Rowett et al. ................ 370/537
2003/0188053 A1 * 10/2003 Tsai ............................ 710/22
2005/0216613 A1 * 9/2005 Ganapathy et al. ............ 710/22

* cited by examiner

Primary Examiner—Henry W. H. Tsai
Assistant Examiner—Kris Rhu
(74) Attorney, Agent, or Firm—Scully, Scott, Murphy & Presser, P.C.; Daniel P. Morris, Esq.

(57) ABSTRACT

A parallel computer system is constructed as a network of interconnected compute nodes. Each of the compute nodes includes at least one processor, a memory and a DMA engine. The DMA engine includes a processor interface for interfacing with the at least one processor, DMA logic, a memory interface for interfacing with the memory, a DMA network interface for interfacing with the network, injection and reception byte counters, injection and reception FIFO metadata, and status registers and control registers. The injection FIFOs maintain memory locations of the injection FIFO metadata memory locations including its current head and tail, and the reception FIFOs maintain the reception FIFO metadata memory locations including its current head and tail. The injection byte counters and reception byte counters may be shared between messages.

16 Claims, 3 Drawing Sheets

DMA SHARED BYTE COUNTERS IN A PARALLEL COMPUTER

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terns of Contract. No. B554331 awarded by the Department of Energy.

CROSS-REFERENCE TO RELATED APPLICATIONS

The present invention is related to the following commonly-owned, co-pending United States patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11,768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUB-GROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCHRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

The invention relates to direct memory access WMA) engines, broadly, and more particularly, the invention relates to a DMA engine capable of supporting a large number of outstanding messages and detection of message completion in a parallel multi-computer system in which there is a DMA engine.

Direct memory access (DMA) allows certain hardware sub-systems within a computer system to access system memory for reading and/or writing that is independent of the central processing unit, or compute nodes comprising processor(s) in the case of parallel computer system. A DMA transfer comprises copying a block of memory (data) from one device to another within a computer or computer system, i.e., from system RAM to or from a buffer on the DMA device w/o interrupting the processor, which is quite important to high-performance embedded systems. The CPU initiates the DMA transfer, but the DMA carries out the task. DMA use is made by disk drive controllers, graphics cards, network cards, sound cards and like devices.

What are known in the art as "third party" DMAs, for example, as used in conjunction with conventional ISA bus operation, are DMA engines or controllers that are normally part of the motherboard chipset for performing the DMA data transfers. Computer systems that employ DMAs, and DMA message passing can transfer data to and from system devices with much less CPU overhead than computer systems constructed to message and pass data without a DMA engine or channel.

SUMMARY OF THE INVENTION

The invention teaches how to share reception and injection byte counters in DMA engines constructed for use in a parallel computer system comprising a plurality of compute nodes (for both computation and I/O tasks or applications) interconnected as a network. Each compute node, or I/O node comprising the parallel computer system includes a plurality of processors, memory and a DMA engine, constructed from a single ASIC such that DMA resources, e.g., DMA reception and injection byte counters, are limited. As such, the invention provides that the processors and the DMA can write and read the shared byte counters in such a way that more outstanding messages can be supported by the DMA engine, and therefore the parallel computer system.

The message passing operation utilizing the DMAs and byte counters therein may be described as follows. The processor(s) at a compute node may write the byte counters to specify an initial value. The DMA engine decrements the byte counter upon packet injection and reception. The processor(s) read(s) the byte counter to determine whether the counter has reached a set value, indicating that all of the bytes in the message have either been injected or received, and that the message, is completed. All accesses to a byte counter are atomic.

The present invention further adds an ability to share a counter between more than one message. An increment capability is added to the (shared) counters to enable sharing. When a compute node or individual processor wants to use the shared byte counter, it increments the current value contained therein by the number of bytes in the message. This is done atomically so that even if the shared byte counter is already in use, the value immediately after increment is equal to the sum of all increments minus the number of bytes injected (received) for the particular atomic message.

To test message completion, the processor or node reads the shared byte counter to determine whether it has reached 0 (message complete). Reaching or counting down to zero (0) signifies that all messages sharing the shared byte counter have been completed. Alternatively, there may be a register indicating which of multiple counters has reached 0, and checking that register for a "hit-zero" bit corresponding to the particular shared counter, as well as for completion of "all" messages using that shared byte counter.

In one embodiment, the invention comprises a parallel computer system constructed as a network of interconnected compute nodes. Each of the compute nodes includes at least one processor, a memory and a DMA engine. The DMA engine includes a processor interface for interfacing with the at least one processor, DMA logic, a memory interface for interfacing with the memory, a DMA network interface for interfacing with the network, injection and reception byte counters, injection and reception FIFO metadata, and status registers and control registers. The injection FIFOs maintain memory locations of the injection FIFO metadata including its current head and tail, and the reception FIFOs maintain the reception FIFO metadata memory locations including its current head and tail. The injection byte counters and reception byte counters may be shared between messages.

In another embodiment, the invention comprises a method for passing messages in a parallel computer system comprising a network of interconnected compute nodes, where each compute node includes at least one processor, a memory and a DMA engine comprising injection and reception byte counters operating with an ability to share the byte counters between one or more messages executed atomically by the system. The method includes at least one processor writing an initial value to a byte counter to be shared, decrementing the shared byte counter by the DMA engine upon message packet injection and reception, the at least one processor reading the shared byte counter to determine when a value contained therein reaches a set value, the set value indicating that all of the bytes comprising the message has been injected or received indicating message completion and to share the shared byte counter before message completion, the at least one processor incrementing the value in the shared byte counter by a number of bytes in a new message upon message initiation.

BRIEF DESCRIPTION OF THE DRAWING FIGURES

The objects, features and advantages of the present invention will become apparent to one skilled in the art, in view of the following detailed description taken in combination with the attached drawings, in which.

DETAILED DESCRIPTION OF THE INVENTION

Figure 1:
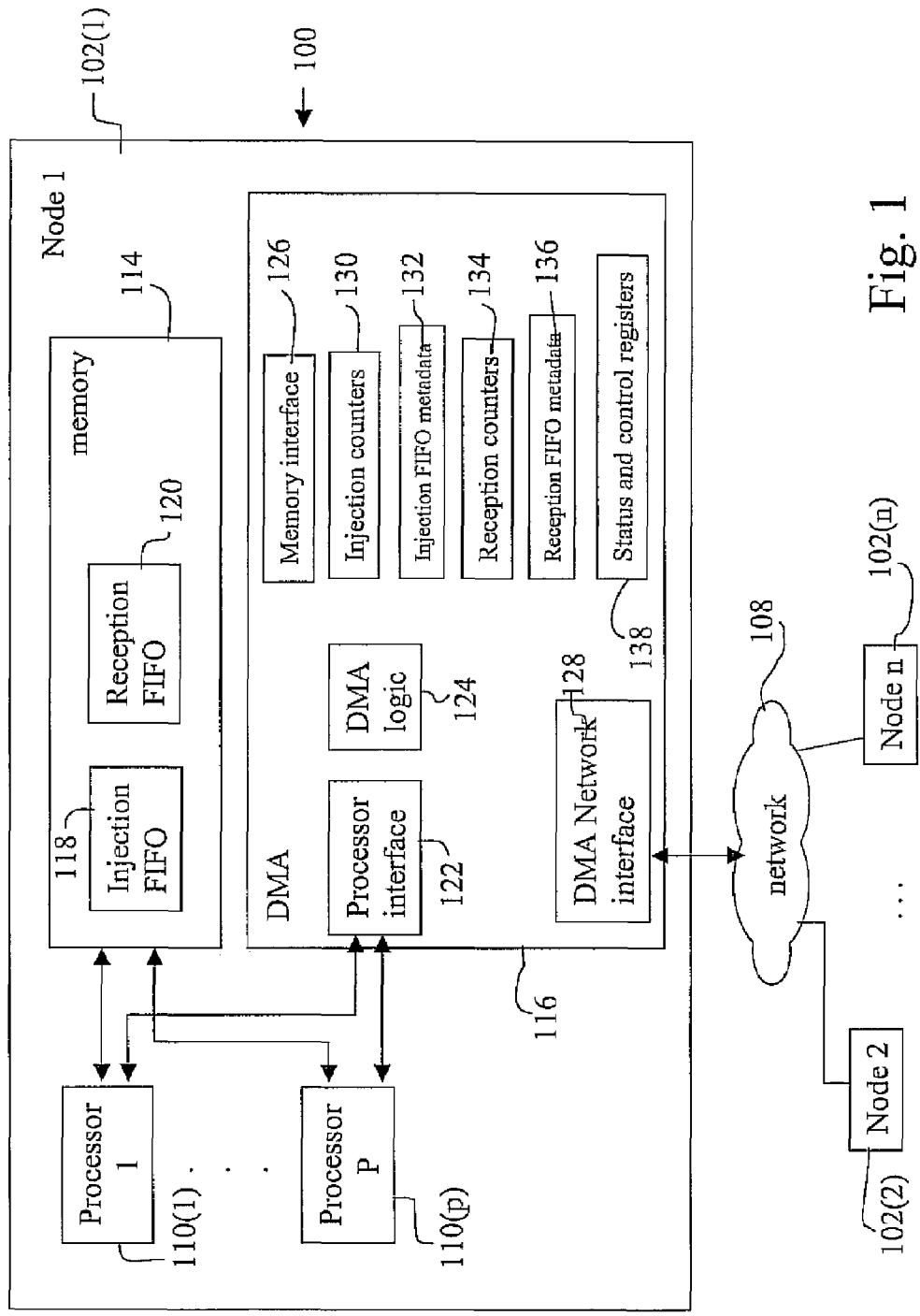
FIG. 1 is schematic diagram highlighting the functional structure of a parallel computer system of the invention, comprising multiple nodes connected together by a network.

The parallel computer system with DMA shared byte counters, and the novel messaging operation provided thereby is set forth and described herein for the purpose of conveying the broad inventive concepts. The drawings and descriptions provided are not meant to limit the scope and spirit of the invention in any way.

The shared byte counters, DMA engine constructed to use the shared byte counters, method of message passing using the DMA engine with shared byte counters are constructed for use in a distributed memory, parallel computer system comprising a plurality of compute nodes interconnected as a network, such as IBM, Inc.'s ultrascalable petaflop parallel supercomputer, as described in commonly-owned, pending U.S. patent application Ser. No. 11/768,905, filed concurrently herewith and entitled: ULTRASCALABLE PETAFLOP PARALLEL SUPERCOMPUTER, incorporated by reference herein. The novel ultrascalable petaflop parallel supercomputer may achieve 1 or multi petaflops, with up to 458,752 processor cores, or 114,688 nodes. BlueGene/P is based upon System-On-a-Chip technology, where each processing node comprises a single Application Specific Integrated Circuit (ASIC).

The ASIC nodes comprising BlueGene/P parallel computer systems are interconnected by multiple independent networks that optimally maximize packet communications throughput the system with minimal latency. The multiple networks may include three high-speed networks for parallel algorithm message passing, including a Torus with direct memory access (DMA), collective network, and a Global Asynchronous network that provides global barrier and notification functions. These multiple independent networks may be collaboratively or independently utilized according to the needs or phases of an algorithm (or running application) for optimizing algorithm-processing performance.

At least four modes of operation are supported: virtual mode, SMP 1-core mode, SMP 4-core mode and dual mode. In the virtual node mode, each of the processing cores will perform its own MPI (message passing interface) task independently. Each core uses a quarter of the memory (L3 and DRAM) of the compute node, while coherence among the four MPI within the node and across the nodes is maintained by MPI. In the SMP (Symmetric Multi Processor) 1-core mode, one core performs a single MPI task, using the entire memory capacity of the node. In the SMP 4-core mode, one MPI task with 4 threads is running, using the whole node memory capacity. The fourth or dual mode is a hybrid case, wherein two SMP MPI tasks are running, with each SMP using 2 processor cores running a thread each. Finally, one can also support modes such as a 1, 3 split, and 1, or 2 or 3 cores idling. Thus a compute node can trade off amount of memory versus parallelism, a feature unique to this supercomputer, or parallel computer system.

Because of the torus's DMA feature, internode communications can overlap with computations running concurrently on the compute nodes. Also, complex forms of messaging protocols, particular arithmetic functions, often called "reduction functions", are required to be invoked on message data as it arrives. One compute node core, or processor, may be designated to perform these functions without distracting computations on other processor cores. Additionally, because of the computational power of the I/O processor, the application is able to define arbitrarily complex reduction functions, supporting new algorithmic development that overlaps computational power with communication activities. For particular classes of parallel algorithms, or parts of parallel calculations, this architecture may apply the power of some or all cores at a particular compute node to work in collaboration on communication activities.

The novel ultrascalable petaflop parallel supercomputer architecture allows the multiple networks or nodes comprising the parallel computer system to be utilized simultaneously, independently, or in collaboration. Because of the system-on-a-chip level integration, in collaboration with operating system software designed to take advantage of this architecture, alternating between such modes of operation can occur with minimal overheads. In cases where the computation is awaiting message arrival, this may happen automatically.

To connect nodes, multiple network paradigms are implemented to interconnect nodes for use individually or simultaneously (in multiples), and include three high-speed networks for parallel algorithm message passing. Additional networks are provided for external connectivity and are used for Input/Output, System Management and Configuration, and Debug and Monitoring services for the compute nodes. The high-speed networks preferably include n-dimensional Torus, collective network, and Global Signal configurations. The use of each of these networks may switch back and forth based on algorithmic needs or phases of algorithms. For example, parts of calculations may be performed with the Torus, or part on the collective network, which facilitates the development of new parallel algorithms that simultaneously employ multiple networks in novel ways.

Each compute node comprises a single ASIC and a plurality of SDRAM-DDR2 memory chips. The compute nodes are interconnected through at least six (6) links in the torus network, the highest aggregate bandwidth of which is a nearest neighbor link that maps the nodes into a physical 3-dimensional torus. The interconnect structure comprises a torus with preferably no asymmetries as the compute nodes communicate with the same bandwidth and nearly the same latency to compute nodes that are physically close as to those compute nodes that are physically located on neighboring racks. Such interconnect structure facilitates simpler programming models. The ASICs that power the compute nodes are based on system-on-a-chip (s-o-c) technology and incorporate all of the functionality needed by the system. The ASICs or compute nodes include 8 MB or more of extremely high bandwidth embedded DRAM. The compute nodes are physically small, allowing for a very high density of processing and optimizing cost/performance.

In a preferred embodiment of the parallel computer system, the system packaging comprises 512 processing compute nodes (as distinguished from I/O nodes) on a doubled-sided board or "midplane". Each processing or compute node contains 4 processor cores for handling computation and message passing operations. In addition, associated with a prescribed plurality of processing nodes is a dedicated I/O node that comprises a quad-processor with external memory, for handling of I/O communications to and from the compute nodes. Each I/O compute node has an operating system (Linux based) that can handle basic tasks and all the functions' necessary for high performance real time code. For compiling, diagnostics, and analysis, a host machine running a global application is required. The I/O compute nodes contain a software layer above the layer on the compute nodes for handling host communications. The choice of host compute node depends on the class of applications, their bandwidth needs and performance requirements.

FIG. 1 herein is a schematic block diagram illustrating one embodiment of an ultrascalable petaflop parallel supercomputer ("parallel computer system 100") of the invention that includes the novel DMA, and implements the DMA's novel message passing using a limited number of shared DMA byte counters. Parallel computer system 100 comprises a plurality of individual compute nodes 102(1), 102(2) . . . 102(n), which as mentioned are constructed as single ASICs and interconnected across network 108. FIG. 1 highlights a preferred construction of one of the compute nodes, ASIC 102(1), constructed in accordance with the principles of the invention. Each of compute nodes (102(n)) is fabricated to integrate all the functions of a computer into a single compute ASIC to enable a dramatic reduction in node size and power consumption. In a supercomputer, or parallel computer system, the reduced node size and its lower power consumption provides for increased node density thereby decreasing the overall cost/performance for the parallel computer system (100).

In more detail, compute node or ASIC 102(1) may function as both a compute node and an I/O node in the parallel computer system (100). Compute node 102(1) comprises a plurality of processors or processor cores, 110(1), . . . 110(p), but preferably four (p=4). Each of the processor cores (110(p)) includes a "double" floating point unit that includes two coupled standard floating-point units. This arrangement gives a peak performance of four floating-point operations per processor core per clock cycle. Preferably, each processor core comprises a PowerPC450 embedded core available from IBM microelectronics. The skilled artisan should note that future versions of this core may be used as technology improves, without deviating from the scope and spirit of the invention. A description of the functionality of such a PowerPC450 core may be found at http//www.ibm.com/chips/power/powerpc/.

Besides the embedded processing cores 110(p), and floating point cores (not shown in FIG. 1), parallel computer system 100 includes a DMA 116 (constructed in accordance with the invention), and a memory 114, (This memory may be implemented as a memory subsystem consisting of embedded DRAM, a memory controller, and normal DRAM. For the purpose of this invention, these details are not important.) Memory 114 includes injection 118 and reception 120 FIFOs. Processors can read and write the memory as can a DMA engine (116). DMA engine 116 consists of a processor interface 122, DMA logic 124, a memory interface 126, and a DMA network interface 128, injection counters 130, injection FIFO metadata 132, reception counters 134, reception FIFO metadata 136 and status and control registers 138. The injection FIFO metadata 132 include pointers to where in memory (114) the Injection FIFOs 118 are located, and the current head and tail of the FIFOs. The Reception FIFO metadata 136 includes pointers to where in memory the Reception FIFOs 120 are located, and the current head and tail of the FIFOs. Especially in a system-on-a-chip implementation, the amount of logic area devoted to the DMA is extremely limited, and thus the number of counters is relatively small. Effective sharing of counters between multiple messages is therefore needed to ensure high quality performance.

DMA engine 116 directly controls transfer of long messages, which long messages are typically preceded by short protocol messages that are deposited into reception FIFOs on a receiving node (for example, compute node 102(2)). Through these protocol messages, the sender compute node and receiver compute node agree on which injection counter (130) and reception counter (134) identifications to use, and what the base offsets are for the messages being processed. Sometimes software can be constructed so that the sender and receiver nodes can agree to the counter ids and offsets without having to send such protocol messages. Long message transfer may be initiated by a core processor on the sender node by placing a "put" message descriptor into an injection FIFO 118 (in memory 114), writing the injection counter base and writing (for a non-shared counter) incrementing (for a shared counter) the counter value via writes via the DMA (memory) interface 126, and appropriately modifying the injection FIFO metadata 132 for that message. This includes advancing a tail pointer in the corresponding injection FIFO metadata indicating the "last" message descriptor via a write to the DMA processor interface 122. DMA logic 124 reads the injection FIFO metadata 132 and recognizes which FIFOs have messages to be sent.

The DMA logic causes the memory interface 126 to read the message descriptor in the Injection FIFO 118. The put message descriptor includes the injection (130) and reception counter (134) ids to be used, the message length, the initial injection and reception offsets of the message, the destination node and other network routing information. The DMA engine 116 begins fetching the message and assembling it into "put" packets to be placed on to the network (108). Each put packet contains the reception counter id, an offset from the reception counter base address (134) where the data from this packet is to be stored, and a count of how many bytes in this packet should be written. Novel DMA engine 116 is responsible for updating this information correctly for each packet, and puts the packets into the DMA network interface 128 (when space is available), at which time the packet enters the network and is routed to the destination compute node (e.g., compute node (p)).

After DMA engine 116 puts the message in the DMA network interface 128, it decrements the specified injection counter 130 by the number of bytes in the packet. Upon reaching the destination, the packet is put into the DMA network interface at that compute node (e.g., 102(p)), and the node's local DMA engine "recognizes" that the packet is there. For a put packet, the receiver compute node's DMA engine reads the reception counter id, offset and count from the received packet, looks up the reception counter base address, writes the appropriate number of bytes starting at the counter's base plus packet offset, and then decrements the counter value by the bytes.

If a remote get operation is used, instead of the processor on the sender node injecting a descriptor into the injection FIFO 118, the receiver node sends a short get message (which contains a put descriptor and an injection FIFO id) to the sender compute node (e.g., 102(p)), and the DMA logic at the sender compute node puts this descriptor into the injection FIFO specified in the packet, and advances that FIFO's metadata appropriately. To share a byte counter, the base address of the shared counter must be set to a value smaller than the base address of any message to be using that counter. The initial value of the shared byte counter is set to zero. The initial offset in a message descriptor is the message's starting address minus this base offset. The particular processor increments the counter value by the current message length, and in accordance with the novel DMA engine and shared byte counter operation, said processor need only know the current message length, but not the lengths of the other messages using the shared byte counter, nor the number of bytes that have already been received. The reader should note that the byte counter can be shared between messages even if the messages come from different source compute nodes.

Network 108 preferably provides all the network link cut-through routing buffers and routing control block that allow any two nodes to communicate with low latency. The four (or "p") processor cores embedded in ASIC (node 102(1)) as shown may be utilized for message handling and computation operations. Virtual cut-through torus routing is supported in a hardware block, which is integrated into the compute nodes (102(p)) to allow for the elimination of the network adapter, typically required in conventional parallel computer system operation. Preferably, a virtual channel routing network is supported with two (2) dynamic and two (2) deterministic channels.

The same compute node ASIC construction is used as an I/O node, which is associated with a subset of the compute nodes (e.g., 16, 32, 64, or 128 compute nodes), for handling fileserver communication and I/O operations. The only difference between an I/O compute node and a computation compute node is that an I/O node enables and uses an external network interface, such as the 10 Gigabit Ethernet (108). While the compute nodes may have the integrated 10 Gb Ethernet (they share a common ASIC), for purposes of discussion, the 10 Gb Ethernet interface is enabled at the I/O nodes only. The 10 Gb Ethernet functional units (XEMAC, ToMAL) interfaces to an arbiter, which arbitrates inputs to L3 from torus DMA and from the 10 Gb Ethernet (108). This allows the processor within a node to set up a transfer and return to handling messages with very little overhead.

As indicated herein, it should be understood that the present invention could be realized in hardware, software, or a combination of hardware and software, such as in the ultrascalable petaflop parallel supercomputer described above. The invention, however, is not limited to applications therein, but may be implemented in any kind of parallel computer/server system(s)—or other parallel computer system adapted for carrying out message passing using the novel DMA engine, and shared byte counters utilized herein. A typical combination of hardware and software could be any general-purpose multiple parallel computer system, or network, operating with a computer program or application that when loaded and executed, carries out the respective methods described herein. Alternatively, a specific use parallel computer system, or linked computer network, containing specialized hardware for carrying out one or more of the functional tasks of the invention, i.e., the message passing using the shared DMA byte counters at compute nodes comprising the system could be utilized.

For that matter, the present invention can also be embodied in a computer program product, which comprises all the respective features enabling the implementation of the methods for utilizing the novel message passing using the shared DMA byte counters as described herein, for example, the exemplary methods depicted in figures herein, and which product—when loaded in the parallel computer system or network, is able to carry out these and related methods. Computer program, software program, program, or software, in the present context mean any expression, in any language, code or notation, of a set of instructions intended to cause a parallel computer network or system having an information processing capability to perform a particular function either directly or after either or both of the following: (a) conversion to another language, code or notation; and/or (b) reproduction in a different material form.

Figure 2:
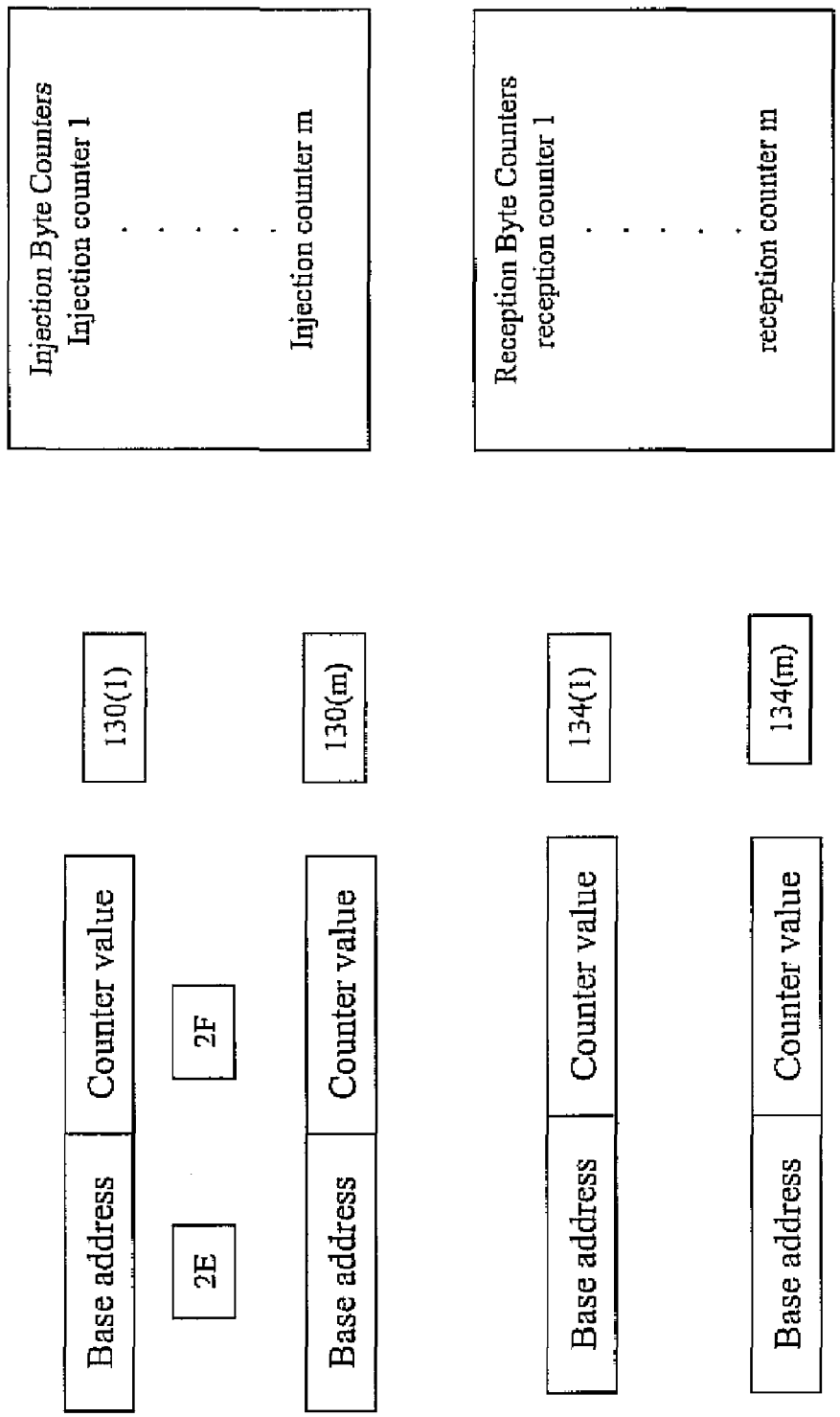
FIG. 2 is schematic representation of injection counters and reception counters utilized in the parallel computer system of the invention (FIG. 1)

FIG. 2 shows in detail multiple shared injection byte counters 130(1) through 130(m), and multiple shared reception byte counters 134(1) through 134(m). Each of the shared byte counters, whether injection or reception, has a base address 2E, and a byte counter value 2F, as indicated in shared injection byte counter 130(1).

Figure 3:
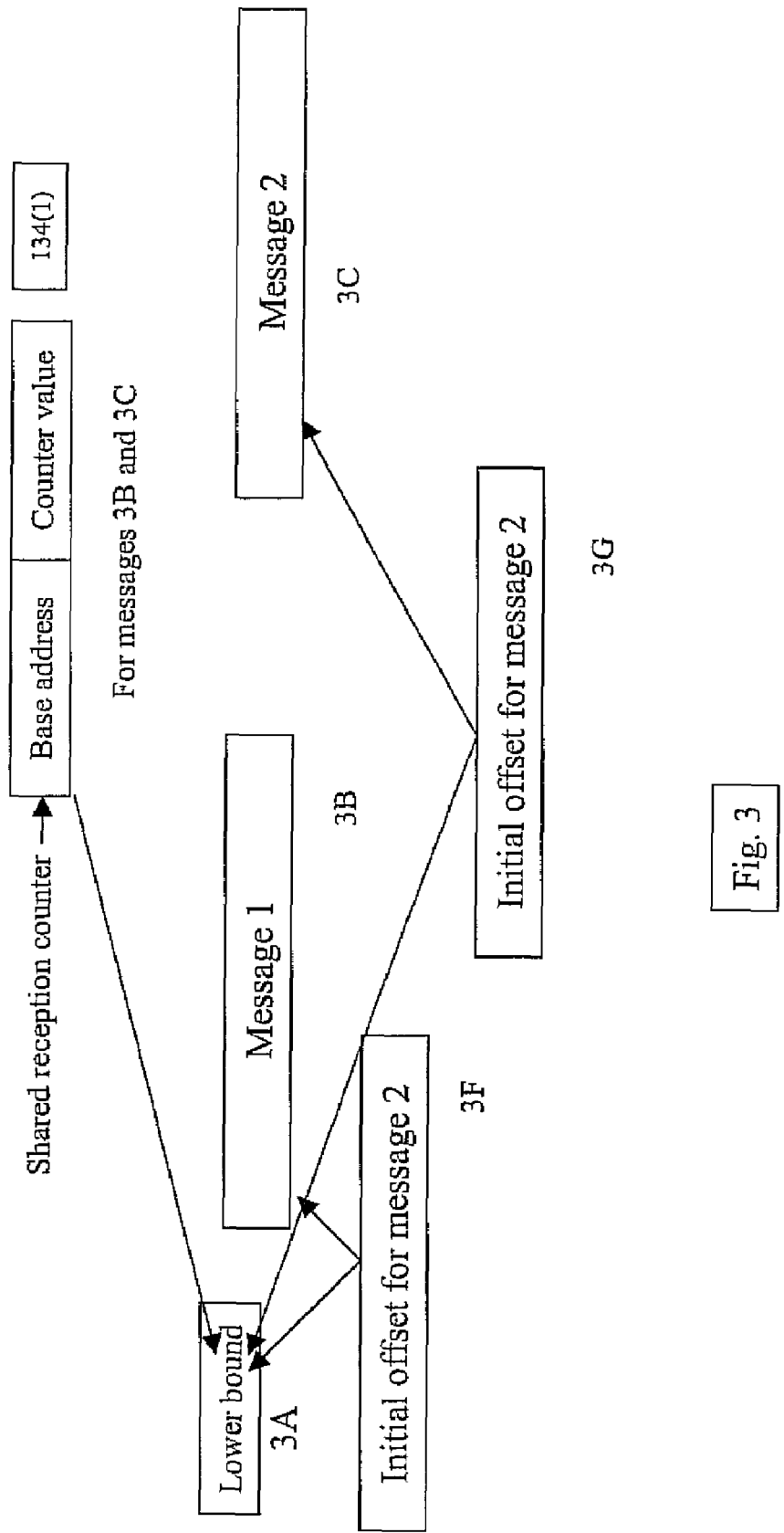
FIG. 3 depicts functional operation of a shared counter (3A) as utilized by multiple messages.

FIG. 3 highlights the operation by which a single shared reception byte counter 130(1) can be used by multiple messages 3B and 3C (in this case two messages). The base address of the shared reception byte counter 134(1) has a value, which is a lower bound (3A in the figure) of the starting addresses of the multiple messages 3B, 3C. The initial offset for each message, identified as 3F, 3G for messages 3D, 3C, respectively, is the difference between the messages' starting addresses and the base address portion contained in shared reception byte counter 134(1) as shown.

The DMA engine shown in FIG. 1, the details of which explained with respect to FIGS. 2 and 3, is particularly suited for passing long messages (which are processed atomically) in the parallel computer system. Long messages are typically preceded by short protocol messages that are deposited into a reception FIFOs on the receiving node. Through these protocol messages, the sender and receiver agree on which injection and reception counter ids to use, and what the base offsets of the message are. The long message transfer can then be initiated by a processor on a sending node, e.g., 102(1), by placing a "put" message descriptor into injection FIFO (memory) 118, writing the injection counter base and value via writes to the DMA processor interface 122 and appropriately modifying the Injection FIFO metadata 132 for that message (e.g., advancing a tail pointer indicating the last message descriptor in the FIFO) via a write to the DMA's processor interface 122. DMA logic 124 is responsible for reading the injection FIFO metadata 132 and recognizing which FIFOs have messages to be sent.

The DMA logic causes the memory interface 126 to read the message descriptor in the Injection FIFO (memory) 118. The put message descriptor includes the injection and reception counter ids to be used, the message length, the initial injection and reception offsets of the message and the destination node and other network routing information. The DMA engine begins fetching the message and assembling it into packets to be put in the network. Each packet contains an offset from the reception counter 134, where the data from this packet is to be stored, and a count of how many bytes in this packet should be written. The DMA is responsible for updating this information correctly for each packet, and puts the packets into the DMA network interface 128 (when space is available) at which time the packet enters the network and is routed to the destination node.

After the DMA puts the message in the DMA network interface, it decrements the shared injection counter by the number of bytes in the packet and adjusts the injection FIFOs metadata by advancing the head pointer. Upon reaching the destination, the packet is put into the DMA network interface at the target compute node, the local DMA of which recognizes that the packet is there. The target DMA reads the reception counter id, offset and count from the packet, looks up the reception counter base address, writes the appropriate number of bytes starting at the base plus packet offset and then decrements the counter value by the bytes.

If a remote get operation is used, instead of the processor on the sending node injecting a descriptor into the injection FIFO, the receiving node sends a short get message (which contains a put descriptor) to the sender, and the sender DMA logic 124 puts this descriptor into the injection FIFO 118 and advances the FIFO's metadata 132 appropriately.

To share a counter, the base address of the shared counter must be set to a value smaller than the base address of any message to be using that counter. The initial value of the counter is set to zero. The initial offset in a message descriptor is the message's starting address minus this base offset. The local processor associated with the message then increments the counter value by the current message length; the local processor only needs to know the current message length, not the lengths of the other messages using this counter, nor how many bytes have already been received. The DMA engine ensures that this increment operation is done atomically, so that immediately after the increment, the counter contains the sum of the number of bytes to be injected (received) minus the number of bytes already injected (received). Thus when the shared injection (reception) counter reaches zero, all bytes in all messages have been sent (received). If the initial value of the counter is not zero, but some arbitrary value C, then all messages are complete when the byte count reaches arbitrary value C. Messages sharing the counter may be sent to/received from different nodes in the parallel computer system.

The invention has been described herein with reference to particular exemplary embodiments. Certain alterations and modifications may be apparent to those skilled in the art, without departing from the scope of the invention. For instance, the task-mapping algorithm may employ the communication cost metric as it running to determine if the result is expected to outperform the default mapping. The exemplary embodiments are meant to be illustrative, not limiting of the scope of the invention.

The invention claimed is:

1. A parallel computer system comprising a network of interconnected compute nodes, wherein each compute node comprises: at least one processor a memory; and a DMA engine comprising a processor interface for interfacing with the at least one processor, DMA logic, a memory interface for interfacing with the memory, a DMA network interface for interfacing with the network, injection and reception byte counters, injection and reception FIFO metadata, and status registers and control registers; wherein the injection FIFO metadata maintains memory locations of the injection FIFO memory locations, including its current head and tail, and the reception FIFO metadata maintains the reception FIFO memory locations, including its current head and tail, wherein the injection byte counters and reception byte counters may be shared between messages, wherein a processor at the compute node increments the counter value maintained in the shared byte counter by the current message length, and the DMA engine atomically carries out the increment operation such that immediately after, the shared byte counter contains a sum of the number of bytes to be injected or received, minus the number of bytes already injected or received, and wherein to receive a long message at a target compute node, the target compute node's DMA engine operates first on at least one short protocol message received by the DMA engine and stored in its reception FIFO to establish protocol between the source compute node of the long message and the target compute node and to establish injection/reception byte counters in a DMA engine at the target compute node that will be used to maintain the long message base offsets.

2. The parallel computer system as set forth in claim 1, wherein each of the injection and reception byte counters store a base memory address and a byte counter value for a message being passed through the compute node associated with same.

3. The parallel computer system as set forth in claim 2, wherein each of the injection and reception byte counters is shared by multiple messages by first setting a base address in the shared byte counter to a lower bound and setting its counter value to zero, and wherein an initial offset in a message descriptor comprising the message is equivalent to difference between the messages start address the base address offset.

4. The parallel computer system as set forth in claim 1, wherein long message transfers may be initiated by the at least one processor injecting a "put" message descriptor into the compute nodes' injection or reception FIFO, and writing the injection counter base address and counter base value to modify the injection FIFO.

5. The parallel computer system as set forth in claim 1, wherein the DMA logic reads the injection FIFO and recognizes which FIFOs have long messages to be sent, and controls the memory interface to read the DMA engine's injection FIFO metadata.

6. The parallel computer system as set forth in claim 5, wherein the DMA logic generates a put message descriptor that identifies injection and reception byte counters to be used for the long message, the message length, the initial injection and reception message offsets, the destination node and other network routing information.

7. The parallel computer system as set forth in claim 6, wherein the DMA logic loads the packets comprising the long message into the DMA network interface for routing to a destination compute node.

8. The parallel computer system as set forth in claim 7, wherein upon loading the message in the DMA network interface, the DMA engine decrements the injection counter by the number of bytes in the packet.

9. The parallel computer system as set forth in claim 8, wherein upon recognition of a message packet in the DMA network interface, the DMA engine reads the reception byte counter ID, offset and count value from the message packet, derives the reception counter base address, writes the appropriate number of bytes starting at the base plus packet offset, and decrements the counter value by said appropriate number of bytes.

10. The parallel computer system as set forth in claim 1, wherein for remote get operations, a processor comprising a target compute node sends a short get message to a source compute node including a put descriptor such that upon receipt, the source compute node DMA logic puts the descriptor into its injection FIFO and advances that FIFO's metadata as required.

11. The parallel computer system as set forth in claim 1, wherein sharing a reception or injection byte counter requires that the shared byte counter's base address be set to a value smaller than the base address of any message which might use the counter, and that the shared byte counter's initial offset is set to the message start address, minus the base offset.

12. A method for passing messages in a parallel computer system comprising a network of interconnected compute nodes, the method comprising the steps of: the at least one processor writing an initial value to a byte counter to be shared; incrementing and decrementing the shared byte counter by the DMA engine upon message packet injection and reception; the at least one processor reading the shared byte counter to determine when a value contained therein reaches a set value, the set value indicating that all of the bytes comprising the message has been injected or received indicating message completion; and to share the shared byte counter before message completion, the at least one processor incrementing the value in the shared byte counter by a number of bytes in a new message, atomically, wherein each compute node includes at least one processor, a memory and a DMA engine comprising injection and reception byte counters operating with an ability to share the byte counters between one or more messages executed atomically by the system, and wherein to receive a long message at a target compute node, the target compute node's DMA engine operates first on at least one short protocol message received by the DMA engine and stored in its reception FIFO to establish protocol between the source compute node of the long message and the target compute node and to establish injection/reception byte counters in a DMA engine at the target compute node that will be used to maintain the long message base offsets.

13. The method for passing messages as set forth in claim 12, wherein the step of incrementing includes adding said value from the initial value in the shared byte counter so that after increment, the shared byte counter's value equals a sum of all increments minus a number of bytes injected for the message.

14. The method for passing messages as set forth in claim 13, further comprising a step of testing message completion by the at least one processor to determine in the value in the shared byte counter has decremented to zero (0).

15. The method for passing messages as set forth in claim 13, further comprising a step of testing message completion by checking a DMA register included to indicate which of the DMA shared byte counters has reached zero (0).

16. A computer program product, comprising: a tangible storage medium readable by a processing circuit and storing instructions for execution by the processing circuit for performing a method for passing messages in a parallel computer system comprising a network of interconnected compute nodes, where each compute node includes at least one processor, a memory and a DMA engine comprising injection and reception byte counters and operating with an ability to share the byte counters between one or more messages executed atomically by the system, the method comprising the steps of: the at least one processor writing an initial value to a byte counter to be shared; incrementing and decrementing the shared byte counter by the DMA engine upon message packet injection and reception; the at least one processor reading the shared byte counter to determine when a value contained therein reaches a set value, the set value indicating that all of the bytes comprising the message has been injected or received indicating message completion; and to share the shared byte counter before message completion, the at least one processor incrementing the value in the shared byte counter by a number of bytes in a new message, atomically, wherein to receive a long message at a target compute node, the target compute node's DMA engine operates first on at least one short protocol message received by the DMA engine and stored in its reception FIFO to establish protocol between the source compute node of the long message and the target compute node and to establish injection/reception byte counters in a DMA engine at the target compute node that will be used to maintain the long message base offsets.

* * * * *